United States Patent Office 3,239,929
Patented Mar. 15, 1966

3,239,929
NICKEL-BASE ALLOY FOR WELDING AND HIGH TEMPERATURE STRUCTURAL APPLICATIONS
Donald E. Ellis, Santa Monica, Calif., and Gary S. Sheffield, Greensboro, N.C., assignors to North American Aviation, Inc.
No Drawing. Filed Feb. 11, 1963, Ser. No. 257,789
12 Claims. (Cl. 29—504)

The present invention relates to a nickel-base alloy for high temperature structural and welding applications, and more particularly to a nickel-base alloy with desirable metallurgical and mechanical properties in the 1000–1800° F. temperature range and suitable for joining ferritic steels.

In certain industries, such as steam power generating, oil refining, and chemical, equipment is often subjected to stresses at elevated temperatures for long periods of time. The final assembly of such equipment as heat exchangers frequently requires a certain amount of in-place welding. With heat-treated steels, such as the ferritic steels, heat treatment of the welded zone is necessary to obtain mechanical properties comparable to the parent metal. However, such heat treatment may be difficult, and the cost thereof reduces the savings over the non-heat-treated austenitic steels. Further, in many modern high temperature, high pressure equipment designs, austenitic and ferritic steels are used together and must be joined. Due to differences in expansion characteristics, high stresses result in such joints and, with temperature cycling, fatigue conditions ensue which may cause failure of the structure at the ferritic-austenite interface. There is, accordingly, the need for an alloy which can be used as a high temperature structural material and also as a transition or weld metal for joining ferritic steel sections to each other or to austenite sections. This would avoid post-weld heat treatment of heat-treated steels while preserving mechanical properties equal to the parent metal in the joint region.

An object of the present invention is to provide an improved nickel-base alloy which has desirable metallurgical and mechanical properties in the 1000–1800° F. temperature range.

Another object is to provide a nickel-base alloy for use as a transition section or weld metal for joining heat-treated steels in which the mechanical properties in the weld area are at least equal to the mechanical properties of the fully heat-treated parent alloy.

Another object is to provide an alloy for joining ferritic and austenitic steel members which will avoid stress concentrations at the interface leading to failure at elevated temperature service.

Another object is to provide such an alloy which will avoid the formation of a brittle interface at the welded joint from carbon migration thereto.

Another object is to provide a high strength nickel-base alloy having good stress-rupture properties and good rupture ductility at elevated temperatures, which is capable of being used in the wrought, annealed, or cast condition.

A further object is to provide an alloy which can be metallurgically bonded to heat-treated steels prior to heat treatment, without affecting the properties of the steel.

Still another object is to provide a method of joining heat-treated steel sections with a transition section of a nickel-base alloy.

The above and other objects and advantages of the present invention will become apparent from the following detailed description.

In accordance with the present invention, a nickel-base alloy is provided having the following general composition (all compositions in this specification are by weight percent):

| | |
|---|---|
| Carbon | about 0.02 to 0.30 |
| Manganese | about 0.05 to 0.75 |
| Chromium | about 0.50 to 10.00 |
| Iron | about 0.50 to 15.00 |
| Molybdenum | about 0.40 to 2.00 |
| Columbium | about 0.05 to 3.00 |
| Vanadium | about 0.05 to 0.75 |
| Silicon | up to about 1.00 |

Remainder nickel and trace amounts of other elements.

The following is a particularly suitable composition range for our alloy:

| | |
|---|---|
| Carbon | about 0.02 to 0.15 |
| Manganese | about 0.30 to 0.60 |
| Chromium | about 1.90 to 2.60 |
| Iron | about 9.00 to 13.00 |
| Molybdenum | about 0.87 to 1.15 |
| Columbium | about 0.10 to 2.50 |
| Vanadium | about 0.40 to 1.50 |
| Silicon | up to about 0.65 |

And the remainder nickel, plus trace amounts of other elements.

Specific preferred compositions conforming to the teachings of our invention are shown in Table I.

TABLE I

| | A | B | C | D |
|---|---|---|---|---|
| Carbon | 0.024 | 0.02 | 0.02 | 0.02 |
| Manganese | 0.365 | 0.50 | 0.50 | 0.50 |
| Chromium | 2.50 | 1.00 | 5.00 | 9.00 |
| Iron | 11.15 | 11.00 | 11.00 | 11.00 |
| Molybdenum | 0.755 | 0.50 | 0.85 | 1.00 |
| Columbium | 2.345 | 0.60 | 2.50 | 2.50 |
| Vanadium | 1.09 | 0.50 | 1.30 | 1.50 |
| Silicon | | | 0.30 | 0.60 |
| Nickel and Trace Impurities | Bal. | Bal. | Bal. | Bal. |

The annealed tensile properties of alloy A are shown in Table II, the wrought tensile properties in Table III, and the stress-rupture properties at elevated temperatures are shown in Table IV, below. This data verifies the excellent properties of the present alloy as a high temperature structural material.

TABLE II

*Average tensile properties of alloy annealed at 1900° F. for one hour*

| Test Temperature (° F.) | Tensile Strength (p.s.i.) | Reduction of Area (Percent) |
|---|---|---|
| 70 | 92,000 | 35.1 |
| 1,200 | 57,140 | 35.5 |

TABLE III

*Wrought tensile properties*

| Test Temperature (° F.) | Tensile Strength (p.s.i.) | Elongation (Percent) |
|---|---|---|
| 70 | 149,710 | 3.5 |

TABLE IV

*1200° F. stress-rupture properties of alloy annealed at 1900° F. for 1 hr.*

| Stress (p.s.i. To Produce Rupture) | | | Elongation in 1 inch (percent) |
|---|---|---|---|
| 100 Hr. | 1,000 Hr. | 10,000 Hr. | |
| 31,000 | 26,000 | [1] 21,500 | [2] 36 |

[1] Extrapolated data.
[2] Obtained from specimen that ruptured after longest time at temperature.

It is not desired to be restricted to any particular mechanism for explaining the functioning of the constituents of our present alloy. It is believed, however, that the alloying constituents function in the following manner: the chromium improves oxidation and corrosion resistance; molybdenum improves high temperature properties, and both short-time and longtime stress resistance; vanadium refines grain sizes and adds strength and toughness to the alloy; the columbium also adds strength; the iron increases strength and the welding properties of the alloy; the manganese is a deoxidizer, combats sulfur corrosion, and decreases hot shortness; the carbon is in proportion to the carbon in the parent metals; and the optional silicon addition is a deoxidizer and adds to creep strength, and its use is desirable as the chromium concentration increases. The nickel base, of course, imparts good elevated temperature strength and gives a non-heat treatable alloy whose properties are not affected by welding.

We have found in the joining of alloy steels with nickel-base alloys a tendency toward low ductility failures in stress-rupture tests at the interface between the parent metal and the nickel alloy. This is believed to be due to interfacial precipitation of carbides, and consequent embrittlement, brought about by my migration of carbon to the interface. It is, therefore, necessary to minimize the carbon activity gradient between our alloy and the steels being joined. This is accomplished by adjusting the carbide-former concentration in our alloy to approximately match the carbon activity in the parent steel. Matching the carbon activity gradient requires consideration of both the carbon content of the alloys and also of the concentration of strong carbide-forming constituents, such as chromium, columbium, and vanadium, which effectively prevent carbon diffusion. Reducing the carbon activity gradient results in eliminating carbon migration to the dissimilar metal interface and premature failure under stress-rupture conditions.

A particular class of ferritic steel alloys generally used for high temperature applications, such as in steam generators and in corrosive environments, contains as its base composition 2¼ Cr—1 Mo. The following table gives the stress-rupture properties of such a steel welded to the alloy of composition A shown in Table I above.

TABLE V

| Stress (p.s.i.) To Produce Rupture | | | Elongation in 1 inch (percent) | Location of Failure |
|---|---|---|---|---|
| 100 Hr. | 1,000 Hr. | 10,000 Hr. | | |
| 18,200 | 14,800 | [1] 12,000 | 36 | Parent ferritic alloy away from interface. |

[1] Extrapolated data.

The test data reported in Table V shows excellent stress-rupture properties with the eventual failure being away from the interface in the parent metal. The approximate matching of carbon activities minimized any carbon migration to the dissimilar metal interface and prevented premature interfacial failure under the stress-rupture test conditions.

The following example teaches the use of the present alloy as a transition section in joining two sections of a 2¼ Cr—1 Mo-base ferritic, heat-treated steel. The transition section alloy was of composition A in Table I. Heats of this composition were swaged into ¾-inch-diameter rods, and these rods were joined to the ferritic steel sections by welding. The welded specimens were given a heat treatment comprising normalizing at 1850° F. for 1 hour and at 1800° F. for 1 hour, followed by tempering at 1300° F. for 8 hours. The nickel alloy ends were joined then by welding. Stress-rupture specimens were machined to include the weld joint in the gauge length. In stress-rupture tests at 1200° F., with rupture times of 454 and 827 hours, the specimen failed in the alloy steel away from the weld interface. No evidence of interfacial embrittlement was observed. Stress-rupture specimens were also taken from the weld material and welded together. The stress-for-rupture at a given time on these specimens at 1200° F. is at least as good as that of the 2¼ Cr—1 Mo alloy steel, which indicates that the present alloy may be used to get 100 percent joint efficiency in welding, using both pressure welding and fusion welding.

While we have shown and described several specific embodiments of our invention, it will be understood that this was merely for purposes of illustration rather than limitation, and that various other alloy embodiments may be devised within the scope of our invention, as defined by the appended claims.

We claim:

1. A nickel-base alloy for welding steel members, the properties of the alloy being essentially unaffected by heat treatment before or after welding, consisting essentially of— about 0.02%–0.30% carbon
about 0.05%–0.75% manganese
about 0.50%–10.00% chromium
about 0.50%–15.00% iron
about 0.40%–2.00% molybdenum
about 0.05%–3.00% columbium
about 0.05%–0.75% vanadium
up to about 1.00% silicon and the remainder essentially nickel and trace amounts of other elements, the concentration of carbide-forming constituents and of carbon in the alloy being further determined by the composition of said steel members so as to minimize carbon activity gradients between said steel members and said alloy.

2. A nickel-base alloy for welding steel members, the properties of the alloy being essentially unaffected by heat treatment before or after welding, consisting essentially of— about 0.02%–0.15% carbon
about 0.30%–0.60% manganese
about 1.90%–2.60% chromium
about 9.00%–13.00% iron
about 0.87%–1.13% molybdenum
about 0.10%–0.225% columbium
about 0.40%–1.50% vanadium
up to about 0.65% silicon and the remainder essentially nickel and trace amounts of other elements, the concentration of carbide-forming constituents and of carbon in the alloy being further determined by the composition of said steel members so as to minimize carbon activity gradients between said steel members and said alloy.

3. A nickel-base alloy for welding steel members, the properties of the alloy being essentially unaffected by heat treatment before or after welding, consisting essentially of— about 0.25% carbon
about 0.35% manganese
about 2.50% chromium
about 11.20% iron
about 0.75% molybdenum
about 2.35% columbium
about 1.10% vanadium and the remainder essentially nickel and trace amounts of other elements, the concentration of carbide-forming constituents and of carbon in the alloy being further determined by the composition of said steel members so as to minimize carbon activity gradients between said steel members and said alloy.

4. A nickel-base alloy for welding steel members, the properties of the alloy being essentially unaffected by heat treatment before or after welding, consisting essentially of— about 0.02% carbon
about 0.50% mangansese
about 1.00% chromium
about 11.00% iron
about 0.50% molybdenum
about 0.60% columbium
about 0.50% vanadium and the remainder essentially nickel and trace amounts of other elements, the concentration of carbide-forming constituents and of carbon in the alloy being further determined by the composition of said steel members so as to minimize carbon activity gradients between said steel members and said alloy.

5. A nickel-base alloy for welding steel members, the properties of the alloy being essentially unaffected by heat treatment before or after welding, consisting essentially of— about 0.02% carbon
about 0.50% manganese
about 5.00% chromium
about 11.00% iron
about 0.85% molybdenum
about 2.50% columbium
about 1.30% vanadium
about 0.30% silicon and the remainder essentially nickel and trace amounts of other elements, the concentration of carbide-forming constituents and of carbon in the alloy being further determined by the composition of said steel members so as to minimize carbon activity gradients between said steel members and said alloy.

6. A nickel-base alloy for welding steel members, the properties of the alloy being essentially unaffected by heat treatment before or after welding, consisting essentially of— about 0.02% carbon
about 0.50% manganese
about 9.00% chromium
about 11.00% iron
about 1.00% molybdenum
about 2.50% columbium
about 1.50% vanadium
about 0.60% silicon and the remainder essentially nickel and trace amounts of other elements, the concentration of carbide-forming constituents and of carbon in the alloy being further determined by the composition of said steel members so as to minimize carbon activity gradients between said steel members and said alloy.

7. A method of joining a ferritic steel member to a steel member selected from the class consisting of ferritic and austenitic steel members which does not require post-weld heat treatment in the weld-affected region and which maintains good mechanical properties in the joint region, which comprises welding said members together with a nickel-base welding alloy whose properties are essentially unaffected by heat treatment before or after welding consisting essentially of— about 0.02%–0.30% carbon
about 0.05%–0.75% manganese
about 0.50%–10.00% chromium
about 0.50%–15.00% iron
about 0.40%–2.00% molybdenum
about 0.05%–3.00% columbium
about 0.05%–0.75% vanadium
up to about 1.00% silicon and the remainder essentially nickel and trace amounts of other elements, the concentration of carbide-forming alloy constituents and of carbon being adjusted prior to welding to minimize carbon activity gradients between said steel members and said alloy.

8. A method of joining 2¼ Cr—1 Mo ferritic steel members which does not require post-weld heat treatment in the weld-affected region, which comprises welding said members together with a nickel-base alloy whose properties are essentially unaffected by heat treatment before or after welding consisting essentially of— about 0.02%–0.15% carbon
about 0.30%–0.60% manganese
about 1.90%–2.60% chromium
about 9.00%–13.00% iron
about 0.87%–1.13% molybdenum
about 0.10%–0.225% columbium
about 0.40%–1.50% vanadium
up to about 0.65% silicon and the remainder essentially nickel and trace amounts of other elements, the concentration of carbide-forming alloy constituents and of carbon being adjusted prior to welding to minimize carbon activity gradients between said steel members and said alloy.

9. The method of claim 8 wherein said nickel-base alloy consists essentially of— about 0.25% carbon
about 0.35% manganese
about 2.50% chromium
about 11.20% iron
about 0.75% molybdenum
about 2.35% columbium
about 1.10% vanadium and the remainder essentially nickel and trace amounts of other elements.

10. A method of joining heat-treated ferritic steel members together which does not require post-weld heat treatment in the weld-affected region, which comprises welding separately to each said member a member of a nickel-base alloy whose properties are essentially unaffected by heat treatment before or after welding consisting essentially of— about 0.02%–0.30% carbon
about 0.05%–0.75% manganese
about 0.50%–10.00% chromium
about 0.50%–15.00% iron
about 0.40%–2.00% molybdenum
about 0.05%–3.00% columbium
about 0.05%–0.75% vanadium
up to about 1.00% silicon and the remainder essentially nickel and trace amounts of other elements, the concentration of carbide-forming alloy constituents and of carbon being adjusted prior to welding to minimize carbon activity gradients between said steel members and said alloy, heat treating each resulting assembly, contacting the nickel alloy sections of the heat-treated members, and welding said members together.

11. A method of joining heat-treated 2¼ Cr—1 Mo ferritic steel members together which does not require post-weld heat treatment in the weld-affected region, which comprises joining to each welding separately to each said member a member of a nickel-base alloy whose properties are essentially unaffected by heat treatment before or after welding consisting essentially of— about 0.02%–0.15% carbon
about 0.30%–0.60% manganese
about 1.90%–2.60% chromium
about 9.00%–13.00% iron
about 0.87%–1.13% molybdenum
about 0.10%–0.225% columbium
about 0.40%–1.50% vanadium
up to about 0.65% silicon and the remainder essentially nickel and trace amounts of other elements, the concentration of carbide-forming alloy constituents and of carbon being adjusted prior to welding to minimize carbon activity gradients between said steel members and said alloy, heat treating each resulting assembly, contacting the nickel alloy sections of the heat-treated members, and welding said members together.

12. The method of claim 11 wherein said nickel-base alloy consists essentially of— about 0.25% carbon
about 0.35% manganese
about 2.50% chromium
about 11.20% iron
about 0.75% molybdenum
about 2.35% columbium
about 1.10% vanadium and the remainder essentially nickel and trace amounts of other elements.

References Cited by the Examiner

UNITED STATES PATENTS

| | | |
|---|---|---|
| 2,512,430 | 6/1950 | Kihlgren. |
| 2,555,256 | 5/1951 | Tyson. |
| 2,576,123 | 11/1951 | Kihlgren et al. _____ 75—171 |
| 2,920,956 | 1/1960 | Nisbet et al. _____ 75—171 |

WHITMORE A. WILTZ, *Primary Examiner.*

JOHN F. CAMPBELL, *Examiner.*